Figure 1:
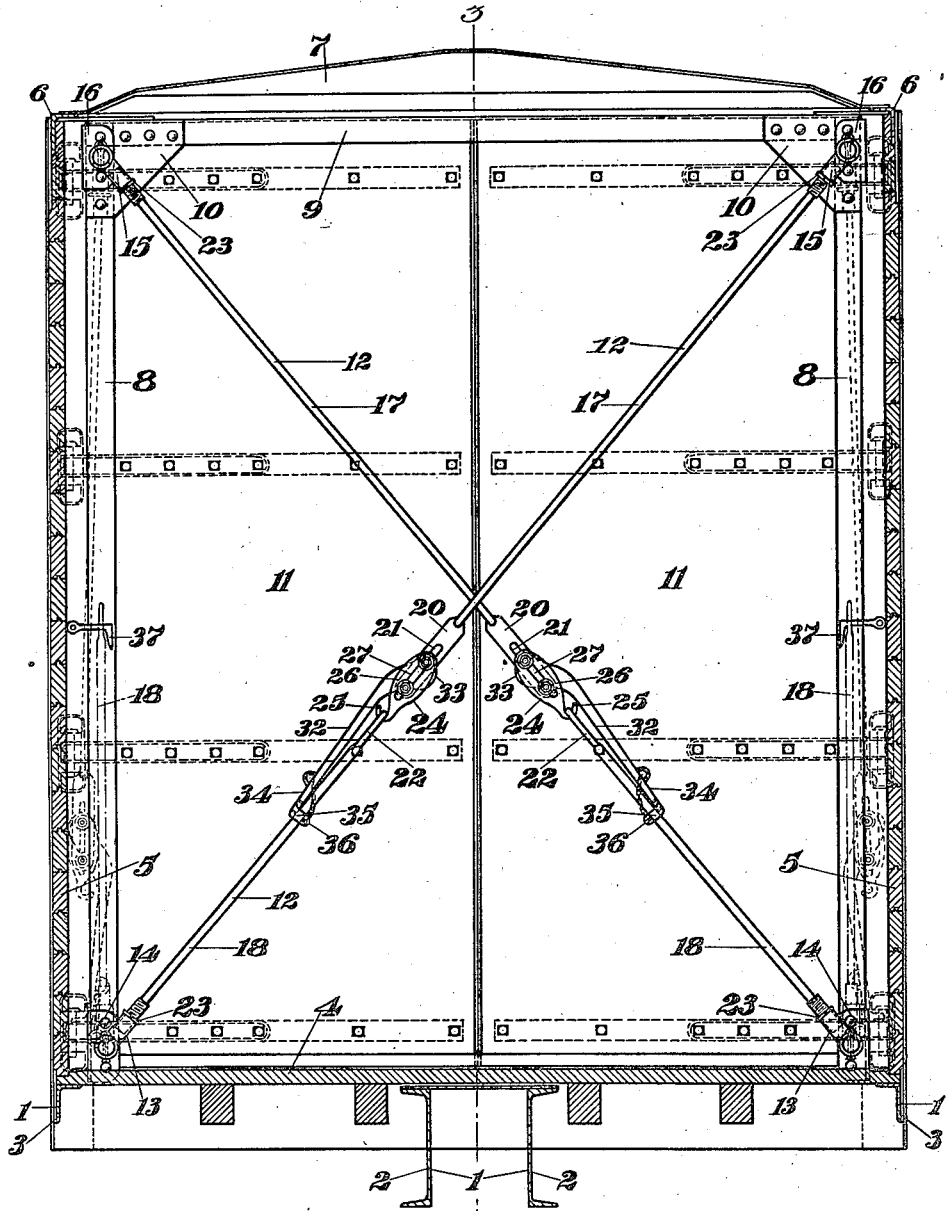

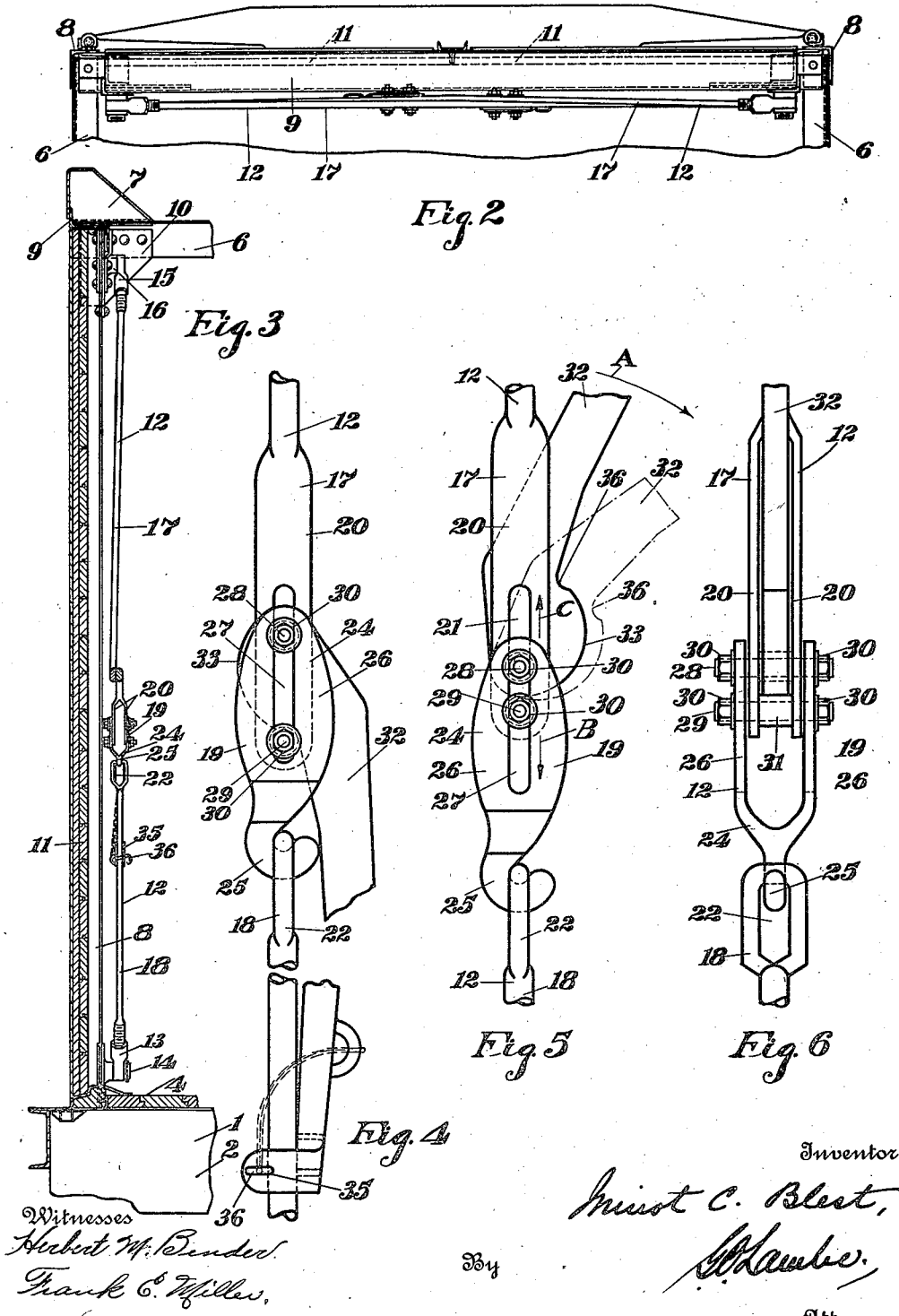

UNITED STATES PATENT OFFICE.

MINOT C. BLEST, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

BRACING FOR CARS.

1,262,301.  Specification of Letters Patent.  Patented Apr. 9, 1918.

Application filed May 24, 1916. Serial No. 99,638.

*To all whom it may concern:*

Be it known that I, MINOT C. BLEST, a citizen of the United States, residing at No. 622 Orchard avenue, Bellevue, in the county of Allegheny and State of Pennsylvania, have invented certain new and useful Improvements in Bracings for Cars, of which the following is a specification.

Heretofore in box cars, and more particularly that type of box car in which the ends are wholly or largely composed of doors, no provision has been made for bracing the body of the car against distortion, which may be caused by running the car over uneven track, or by heavy service shocks to which a car is subjected, and an object of the invention is to provide means for bracing the bodies of such cars against distortion.

In the ordinary box car the ends of the body may be strengthened by permanent vertical, transverse or diagonal bracing which may prevent undue distortion of the body as a whole, but in a box car where the end of the car is provided with a large door opening, for facilitating the loading of automobiles, etc., suitable permanent vertical transverse or diagonal bracing cannot be used without obstructing the door opening. The only end framing in this type of car is the door frame which on account of its construction cannot without additional bracing prevent distortion of the body. The large end doors for closing the door opening do to a certain extent brace the end of the body, but it has been observed that the distortion of the body has been so great in many cases as to cause open spaces between the doors and the door frame, thus allowing rain, dust, cinders, etc., to enter the car, or prevent the proper and easy closing and opening of the doors.

An object of the invention is to provide bracing means, which when applied to a car body and especially to that type of car body having a large end door opening, will brace the body against distortion and will eliminate the above mentioned objectionable features.

Another object of the invention is to provide a bracing means, which when applied to a car body having a large end door opening, may be moved to a position where it will not obstruct the door opening when the car is being loaded or unloaded.

Another object of the invention is to provide an adjustable bracing means for car bodies.

Another object of the invention is to provide a car body end brace embodying mechanism adapted to put said brace in tension when in its normal position in the car.

Referring now to the drawings, in which like reference characters refer to like parts, Figure 1 is a cross sectional view of a car embodying the invention; Fig. 2 is a plan view of a portion of the car, the end plate being removed to more clearly illustrate the invention; Fig. 3 is a sectional view taken on the line 3—3 of Fig. 1; and Figs. 4, 5 and 6 are enlarged detail views of portions of the end brace.

Referring now in detail to the drawings, 1 indicates the underframe which may be of any desired construction, and may comprise a center sill 2 and side sills 3 which may be connected by the usual cross members (not shown).

The superstructure of the car may be of any suitable construction, and may be provided with a floor 4 and side walls 5 which walls may be secured to the usual side framing members (not shown). At the top portions of the side walls, side plates 6 may be provided which may be connected together at their ends by an end plate 7.

At the end of the car body posts 8 are provided which at their lower ends are suitably connected with the underframe, and at their upper ends are connected together by a transverse member 9 through the medium of gusset plates 10. The upper end portion of each of these posts 8 may be connected with one of the side plates 6. The posts 8 and the transverse member 9 define an opening in the end portion of the car body, which opening is closed by doors 11 hinged to the end portion of the car. No locking means for the doors has been shown in the drawings, but it will be understood that any suitable means may be provided.

At the end of the car body, and preferably within such body, braces 12 are provided which at their lower ends are provided with threaded socket members 13 which are pivotally connected with the members 14 secured to the lower end portions of the posts 8. These braces extend across the door opening and at their upper ends are provided with threaded socket members 15 which are pivotally connected with the members 16 secured to the upper end portions of the posts 8. Each of these braces 12 preferably comprises parts 17 and 18 and a tightening device 19. The lower end portion of the part 17 is preferably formed with spaced portions 20 in which slots 21 are formed, and the upper end portion of the part 18 has formed therein an eye 22. The upper end portion of the part 17 is provided with screw threads and is screwed in the threaded portion of the socket member 15, and the lower end portion of the part 18 is provided with screw threads and is screwed in the threaded portion of the socket member 13, thus providing means whereby the length of the brace may be adjusted. The threaded end of each of the parts 17 and 18 are provided with threaded nuts 23, which, when it is desired to hold these parts in any adjusted position, may be turned to contact with the socket members 13 and 15. The tightening device 19 comprises a yoke 24 having a hook 25 adapted to engage the eye portion 22 of the part 18. The side portions 26 of this yoke are provided with slots 27, and are adapted to overlap the lower end portions of the part 17 and are adjustably connected with the portions 20 of such part by bolts 28 and 29, which are passed through the slots 21 and 27, and held against longitudinal movement by nuts 30, or other suitable means. The bolt 28 is adapted to contact with the yoke 24 at the end of the slots 27, and is adapted to move freely in the slots 21 of the part 17 while the bolt 29 is adapted to contact with the part 17 at the end of the slots 21 and is adapted to move freely in the slots 27 of the yoke, thus permitting free relative movement between the part 17 and the yoke 24. Between the spaced portions 20 of the part 17 the bolt 29 is provided with a roller 31 which may rotate freely on the bolt and at the same time keep the portions 20 spaced apart.

This tightening device also comprises a lever 32, which at one end is suitably mounted on the bolt 28, and is provided with a cam surface 33, which is adapted to contact with the roller 31 mounted on the bolt 29. At the other end this lever is provided with a hand portion 34 formed with spaced portions 35, the use of which will hereinafter be more fully described. When the lever is moved in the direction indicated by the arrow A in Fig. 5, the cam surface 33 contacts with the roller 31 and forces the bolt 29 in the direction indicated by the arrow B in Fig. 5 into contact with the parts 20 at the ends of the slots 21 and sets up tension in the part 17, and at the same time causes the bolt 28 to move in the direction indicated by the arrow C in Fig. 5 into contact with the yoke 24 at the end of the slots 27, thus setting up tension in the part 18. It will be understood that if desired the roller 31 may be dispensed with and that the cam surface may contact directly with the bolt 29. At the end of the cam surface 22 a notch 36 is provided in which the roller 31 is adapted to seat when the brace has been tightened, thus automatically locking the lever in position. When the lever is in this position the spaced portions 35 partly surround the part 18 and extend a sufficient distance past the same to permit of the insertion of a pin 36 or other suitable means, to hold the lever against accidental movement. When the tightening devices are released from the eye portions of the parts 18, the parts 17 and the tightening devices will swing by gravity to substantially vertical positions of rest substantially clear of the door opening, and the parts 18 are then swung to a position substantially clear of the door opening as shown in dotted lines in Fig. 1, and are held in such positions by latches 37 or other suitable means secured to the car body.

In the foregoing description the bolts 28 and 29 have both been described as being capable of movement when the braces are being tightened, but it is to be understood that one of these bolts may remain substantially stationary, and that the other bolt may be moved when the brace is being tightened, and it is also to be understood that instead of attaching the lower ends of the braces to the posts 8, they may be attached to any other suitable member of the car body or underframe.

Although the bracing means has been described as being applied to the end of the body, it will be understood that it may be applied at any desired point or points intermediate the ends of the car.

I do not wish to be limited to the exact construction of the car or the brace, as described in the specification, for it will be apparent to those skilled in the art to which this invention appertains, that many changes may be made without departing from the spirit and scope of the invention, as set forth in the appended claims.

Having thus described the invention, what I desire to secure by Letters Patent is:

1. In a car, the combination with the body having a door opening formed in its end, of braces connected with said body adapted to extend across said door opening when in operative position and adapted to be moved substantially clear of said opening when in inoperative position.

2. A car body having a door opening formed in its end, and braces connected with said body adapted to extend across said door opening when in operative position, and adapted to be moved substantially clear of said opening when in inoperative position.

3. In a car, the combination with the underframe of a body carried by said underframe, said body having a door opening in its end, braces connected with said body adapted to extend across said opening when in operative position, and adapted to be swung substantially clear of said opening when in inoperative position, and means for tightening said braces when in operative position.

4. In a car, the combination with the underframe of a superstructure connected with said underframe, said superstructure defining an opening at the end of the car, braces secured to said superstructure adapted to extend across said opening when in operative position and adapted to be swung substantially clear of said opening when in inoperative position.

5. A car having a door opening formed in its end, and means connected with said car adapted to extend across said opening and counteract distortion of the car body when in operative position, said means being movable from said opening to inoperative position near the sides of said car.

6. A car body having a door opening formed in its end, braces arranged within said body adapted to counteract distortion of the car body, said braces extending diagonally across said opening when in operative positions and being movable to inoperative positions clear of said opening.

7. A car body having a door opening formed in its end, and braces arranged within said body adapted to draw and hold said body in normal condition, said braces when in operative position extending across said opening, and when in inoperative position being substantially outside of the lines of said opening.

8. In a car, the combination with the body thereof, of a brace extending across said body, said brace comprising a plurality of parts, said parts being movable to inoperative positions near the sides of said body, and a latch adapted to hold one of said parts in inoperative position.

9. In a car, the combination with the body thereof, of a brace adapted to extend across said body, said brace comprising a plurality of parts movable to inoperative positions near the sides of said body, and a latch adapted to engage and hold one of said parts in inoperative position, the other of said parts being held in inoperative position by gravity.

10. A car having a superstructure framing, braces extending diagonally across said body when in operative position, each of said braces being connected to the top portion of said framing at one side of the car and to the bottom portion of the framing at the opposite side of the car, said braces crossing each other intermediate their ends and movable to inoperative positions near the sides of said body.

11. A car body of box form, adjustable braces secured to said body, each of said braces extending diagonally from an upper corner of said body to a lower corner of said body and adapted to draw and hold said body in normal condition, said braces being movable to inoperative positions near the sides of said body.

12. A car body of box form, braces secured to said body and extending diagonally in opposite directions, each of said braces extending from an upper corner of said body to a lower corner thereof when in operative positions, said braces being movable to inoperative positions near the sides of said body.

13. A car body of box form having a door opening formed in its end, braces secured to said body extending diagonally across said opening in opposite directions, each of said braces extending from an upper corner of the body to a lower corner of the body and adapted to counteract distortion of the body, said braces being movable to positions clear of said opening.

14. A car body having a door opening in its end, framing defining said opening, a brace connected at one end to one of the upper corners of said framing and connected at its other end to one of the lower corners of said framing, said brace extending diagonally across said opening when in operative position and being movable to inoperative position near the sides of the car clear of said opening.

15. A car body having a door opening formed in its end, framing defining said opening, braces secured to said framing and extending diagonally across said opening in opposite directions when in operative positions, each of said braces comprising upper and lower parts, said lower part being movable to inoperative position near one of the side walls of said body and said upper part being movable to inoperative position near the opposite side wall of the body.

16. In a car, the combination with the body thereof, of a brace extending from one of the upper corners of the body to a diagonally opposite lower corner of the body when in operative position, said brace being movable to a position substantially clear of the space inside of said body.

17. In a car, the combination with the body thereof, of braces extending from the upper corners of the body diagonally to the lower corners of the body when in operative positions, each of said braces comprising a plurality of parts movable to inoperative positions substantially clear of the space within said body.

18. A car body having a door opening in its end, framing defining said opening, said framing comprising end posts, braces extending diagonally across said opening when in operative positions and each connected with the top portion of one of said posts and with the lower portion of the opposite post, said braces being movable to inoperative positions clear of said opening.

19. A car body of box form, braces secured to said body and extending diagonally in opposite directions, each of said braces extending from an upper corner of said body to a lower corner thereof when in operative positions and being movable to inoperative positions near the sides of said body, each of said braces comprising a plurality of parts attached to said body, a yoke carried by one of said parts adapted to engage the other of said parts, means between said yoke and first mentioned part for tightening said brace, and means for automatically locking said brace in operative position.

20. A car body of box form, braces secured to said body and extending diagonally in opposite directions, each of said braces extending from an upper corner of said body to a lower corner thereof when in operative positions and being movable to inoperative positions near the sides of said body, each of said braces comprising a plurality of parts, one of said parts having slots formed therein, a yoke for operatively connecting said parts, said yoke having slots formed therein, a member extending through the slots in said part and yoke, and a lever on said yoke adapted to engage said member to adjust the effective length of said brace.

21. A car body of box form, braces secured to said body and extending diagonally in opposite directions, each of said braces extending from an upper corner of said body to a lower corner thereof when in operative positions and being movable to inoperative positions near the sides of said body, each of said braces comprising a plurality of parts, a member loosely connected with one of said parts adapted to removably engage the other of said parts, and means for shortening the effective length of said brace.

22. A car body of box form, braces secured to said body and extending diagonally in opposite directions, each of said braces extending from an upper corner of said body to a lower corner thereof when in operative positions and being movable to inoperative positions near the sides of said body, each of said braces comprising a plurality of movable parts, a yoke loosely mounted on one of said parts adapted to movably engage the other of said parts, a lever carried by said yoke, said lever having a notched cam surface adapted to engage said part to adjust the effective length of said brace and automatically lock said brace in operative position.

23. A car body of box form, braces secured to said body and extending diagonally in opposite directions, each of said braces extending from an upper corner of said body to a lower corner thereof when in operative positions and being movable to inoperative positions near the sides of said body, each of said braces comprising a plurality of movable parts, one of said parts having slots formed therein, a yoke for automatically connecting said parts, said yoke having slots formed therein, a member extending through the slots in said part and yoke, and a lever on said yoke adapted to engage said member to adjust the effective length of said brace, said lever having a notch formed therein adapted to receive said member to automatically lock said brace in operative position.

24. A car body of box form, braces secured to said body and extending diagonally in opposite directions, each of said braces extending from an upper corner of said body to a lower corner thereof when in operative positions and being movable to inoperative positions near the sides of said body, each of said braces comprising a plurality of parts, a yoke carried by one of said parts and having a hooked portion adapted to engage the other of said parts, a lever operatively carried by said yoke, a member carried by said first mentioned part, and means on said lever adapted to contact with and move said member to tighten said brace when in operative position.

25. A car body of box form, braces secured to said body and extending diagonally in opposite directions, each of said braces extending from an upper corner of said body to a lower corner thereof when in operative positions and being movable to inoperative positions near the sides of said body, each of said braces comprising a plurality of parts, a yoke carried by one of said parts adapted to engage the other of said parts, a lever operatively carried by said yoke, and means between said lever and said first mentioned part for tightening said brace in operative position.

26. A car body of box form, braces secured to said body and extending diagonally in opposite directions, each of said braces extending from an upper corner of said body to a lower corner thereof when in operative positions and being movable to inoperative positions near the sides of said body, each of said braces comprising a plurality of parts, a member loosely connected with one of said parts and having a hooked portion adapted to engage the other of said parts, and means between said first mentioned part and said member for shortening the effective length of said brace when in operative position.

27. In car having a door opening formed in its end, side walls, a brace extending diagonally across the space between said walls and across said door opening, said brace being movable to inoperative position near the side walls and clear of said door opening.

28. In a car, the combination with the body thereof having a door opening formed in its end, a brace extending diagonally across said body and across said door opening, said brace comprising a plurality of pivotally mounted parts adapted to be moved to inoperative positions near the sides of said body and clear of said door opening.

29. In a car, the combination with the body thereof having a door opening formed in its end, of a brace extending across said door opening, said brace comprising a plurality of parts movable to inoperative positions near the sides of said body and clear of said door opening.

In testimony whereof I affix my signature in presence of two witnesses.

MINOT C. BLEST.

Witnesses:
FRANK E. MILLER,
HERBERT M. BENDER.